(12) United States Patent
Katz et al.

(10) Patent No.: US 8,803,952 B2
(45) Date of Patent: Aug. 12, 2014

(54) PLURAL DETECTOR TIME-OF-FLIGHT DEPTH MAPPING

(75) Inventors: Sagi Katz, Yokneam Ilit (IL); Avishai Adler, Haifa (IL); Giora Yahav, Haifa (IL); John Tardif, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 12/973,671

(22) Filed: Dec. 20, 2010

(65) Prior Publication Data

US 2012/0154542 A1 Jun. 21, 2012

(51) Int. Cl.
*H04N 13/02* (2006.01)
*A63F 13/06* (2006.01)
*G01S 17/89* (2006.01)
*G01S 17/87* (2006.01)

(52) U.S. Cl.
CPC ............ *A63F 13/06* (2013.01); *G01S 17/89* (2013.01); *G01S 17/87* (2013.01); *A63F 2300/1087* (2013.01)
USPC .......................................................... 348/47

(58) Field of Classification Search
USPC .......................................................... 348/47
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |

(Continued)

FOREIGN PATENT DOCUMENTS

| | | |
|---|---|---|
| CN | 1575524 A | 2/2005 |
| CN | 201254344 B | 6/2010 |

(Continued)

OTHER PUBLICATIONS

Whyte et al., "Multiple range imaging camera operation with minimal performance impact", Retrieved at << http://researchcommons.waikato.ac.nz/bitstream/10289/3826/1/Multiple%20range%20imaging%20camera.pdf >>, 2010, pp. 10.

(Continued)

*Primary Examiner* — Sath V Perungavoor
*Assistant Examiner* — Peter D Le
(74) *Attorney, Agent, or Firm* — Gregg Wisdom; Micky Minhas; Alleman Hall McCoy Russell & Tuttle LLP

(57) ABSTRACT

A depth-mapping method comprises exposing first and second detectors oriented along different optical axes to light dispersed from a scene, and furnishing an output responsive to a depth coordinate of a locus of the scene. The output increases with an increasing first amount of light received by the first detector during a first period, and decreases with an increasing second amount of light received by the second detector during a second period different than the first.

20 Claims, 8 Drawing Sheets

(56) References Cited

U.S. PATENT DOCUMENTS

| | | |
|---|---|---|
| 4,901,362 A | 2/1990 | Terzian |
| 4,925,189 A | 5/1990 | Braeunig |
| 5,081,530 A * | 1/1992 | Medina .................. 348/46 |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |

(56) References Cited

U.S. PATENT DOCUMENTS

| | | |
|---|---|---|
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,090,194 B2* | 1/2012 | Golrdon et al. ............... 382/154 |
| 2004/0005092 A1* | 1/2004 | Tomasi .......... 382/154 |
| 2006/0114333 A1* | 6/2006 | Gokturk et al. ............ 348/222.1 |
| 2006/0221250 A1* | 10/2006 | Rossbach et al. ............. 348/630 |
| 2007/0064976 A1* | 3/2007 | England ........................ 382/106 |
| 2008/0019470 A1* | 1/2008 | Nam et al. .................... 375/355 |
| 2008/0026838 A1 | 1/2008 | Dunstan et al. |
| 2008/0084486 A1* | 4/2008 | Enge et al. .................... 348/239 |
| 2008/0246759 A1* | 10/2008 | Summers ...................... 345/420 |
| 2008/0249419 A1 | 10/2008 | Sekins et al. |
| 2009/0128833 A1 | 5/2009 | Yahav |
| 2010/0171813 A1 | 7/2010 | Pelman et al. |
| 2010/0197400 A1* | 8/2010 | Geiss .............................. 463/32 |
| 2011/0007939 A1* | 1/2011 | Teng et al. .................... 382/103 |

FOREIGN PATENT DOCUMENTS

| | | |
|---|---|---|
| CN | 101866056 A | 10/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 04001332 A1 | 12/2003 |

OTHER PUBLICATIONS

Gokturk et al., "A Time-Of-Flight Depth Sensor—System Description, Issues and Solutions", Retrieved at << http://www.canesta.com/assets/pdf/technicalpapers/CVPR_Submission_TOF.pdf >>,Jan. 24, 2005, pp. 9.

Kim et al., "Multi-view Image and ToF Sensor Fusion for Dense 3D Reconstruction", Retrieved at << http://ieeexplore.ieee.org/stamp/stamp.jsp?arnumber=05457430 >>, 2009, pp. 8.

Zhu et al., "Fusion of Time-of-Flight Depth and Stereo for High Accuracy Depth Maps", Retrieved at << http://ieeexplore.ieee.org/stamp/stamp.jsp?arnumber=04587761>>, Aug. 5, 2008, pp. 8.

Blais et al., "Range Error Analysis of an Integrated Time-of-Flight, Triangulation, and Photogrammetric 3D Laser Scanning System", Retrieved at << http://citeseerx.ist.psu.edu/viewdoc/download-?doi=10.1.1.28.2638&rep=rep1&type=pdf >>,Apr. 2000, pp. 14.

Stoppa et al., "A New Architecture for TOF-based Range-finding Sensor", Retrieved at << http://ieeexplore.ieee.org/stamp/stamp.jsp?tp=&arnumber=1426205 >>,2004, pp. 4.

Katz, Sagi et al., "Time-Of-Flight Depth Mapping," U.S. Appl. No. 12/897,145, filed Oct. 4, 2010, 49 pages.

"Integrated Low Power Depth Camera and Projection Device," U.S. Appl. No. 12/892,589, filed Sep. 28, 2010, 36 pages.

Lucas, Bruce D. et al., "An Iterative Image Registration Technique with an Application to Stereo Vision," Proceedings of Imaging Understanding Workshop, pp. 121-130 (1981), 10 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

State Intellectual Property Office of China, Office Action of Chinese Patent Application No. 201110428489.9, Nov. 20, 2013, 12 pages.

\* cited by examiner

US 8,803,952 B2

PLURAL DETECTOR TIME-OF-FLIGHT DEPTH MAPPING

BACKGROUND

Time-of-flight (TOF) depth mapping is a known approach for constructing a three-dimensional (3D) virtual model of a scene or subject. Encouraged by ever-improving digital-imaging technology and the availability of low-cost pulsed illumination, this approach is now used in applications ranging from aircraft navigation to robotics to video gaming, for example. Despite such broad applicability, the cost of conventional TOF depth mapping systems increases sharply with available depth resolution, particularly in the one-to-ten meter depth range. At these distances, the resolution may be affected by subject motion, and, by parallax error when non-optically aligned detectors are employed.

SUMMARY

One embodiment of this disclosure provides a depth-mapping method. The method comprises exposing first and second detectors oriented along different optical axes to light dispersed from a scene, and furnishing an output responsive to a depth coordinate of a locus of the scene. The output increases with an increasing first amount of light received by the first detector during a first period, and decreases with an increasing second amount of light received by the second detector during a second period different than the first.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 1:
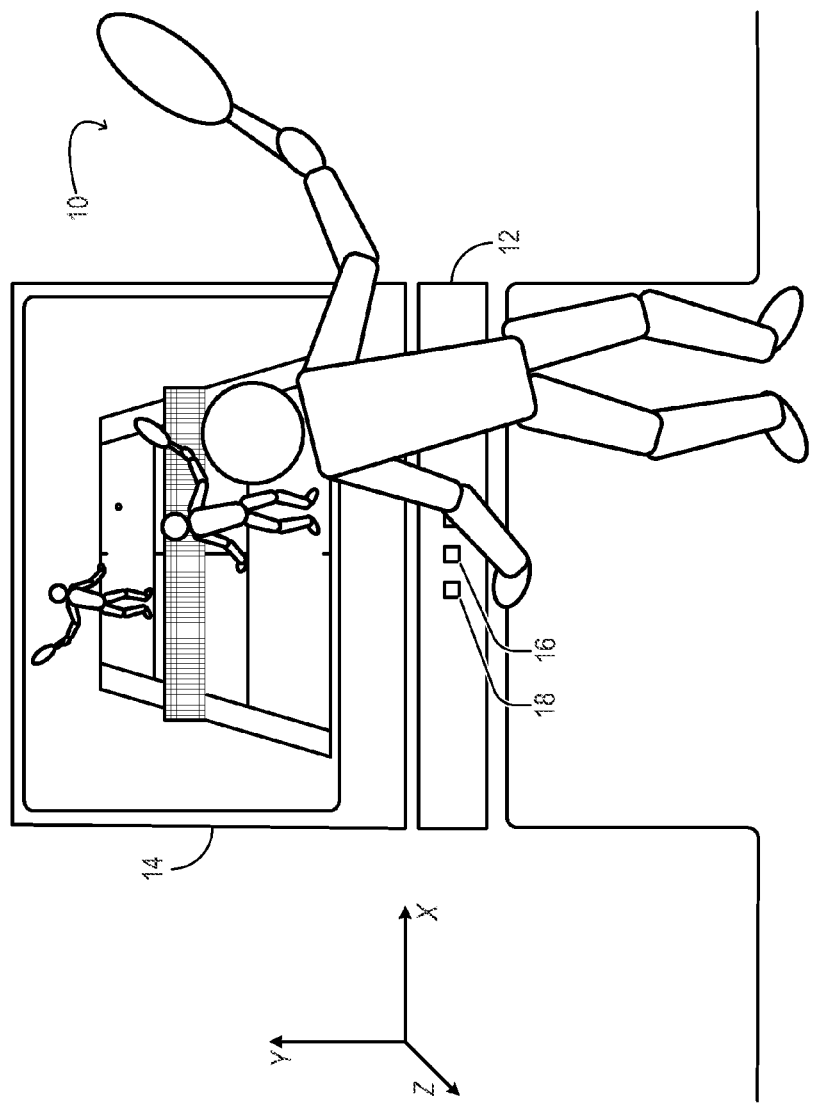
FIG. 1 schematically shows an example environment for depth mapping in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

FIG. 1 shows an example environment in which depth mapping may be used to an advantage. The drawing shows subject 10 interacting with vision system 12. In the illustrated embodiment, the vision system is a component of a video-game system, and the subject is a video gamer. The vision system is configured to detect the positions, movements, and/or gestures of the subject and to furnish the same as input to a video-game application. The vision system is further configured to direct video output from the video-game application to display 14.

To provide a richer input, more suggestive of a virtual reality, vision system 12 is configured to detect and furnish the positions, movements, and/or gestures of the subject in three dimensions (3D). Such dimensions may correspond, for instance, to Cartesian coordinates X, Y, and Z. As described herein, 3D detection may be accomplished via depth mapping. Depth mapping associates a depth coordinate Z with a corresponding pixel (X, Y) in a plane image of a scene. This process maps a plurality of loci of the imaged scene in 3D, providing a depth coordinate for each locus of the imaged scene. The scene, as in the present example, may include a stationary or moving subject.

Although FIG. 1 and subsequent drawings illustrate depth mapping as applied to video gaming, other applications are contemplated as well, and are equally embraced by this disclosure. Such applications include control of non-game applications and operating systems, autonomous vehicle guidance, robotics, and range finding, among numerous other examples. In FIG. 1, vision system 12 is oriented opposite subject 10. The vision system and the subject may be separated by any suitable distance. The vision system, for example, may be two to four meters away from the subject.

Vision system 12 includes illumination source 16 and first detector 18. In the illustrated embodiment, both the illumination source and the first detector are coupled at the front face of the vision system, opposite subject 10.

Illumination source 16 is an intensity-modulated source configured to emit a train of narrow pulses of suitably intense light. This light, reflected from subject 10, is imaged by first detector 18. In some embodiments, the illumination source may pulse-modulate with a pulse-width of fifteen to twenty nanoseconds. In some embodiments, the illumination source may be configured to emit infrared (IR) or near-infrared (NIR) light. To this end, the illumination source may comprise a pulsed IR or NIR laser. In these and other embodiments, the illumination source may comprise one or more IR or NIR light-emitting diodes (LED's).

Figure 2:
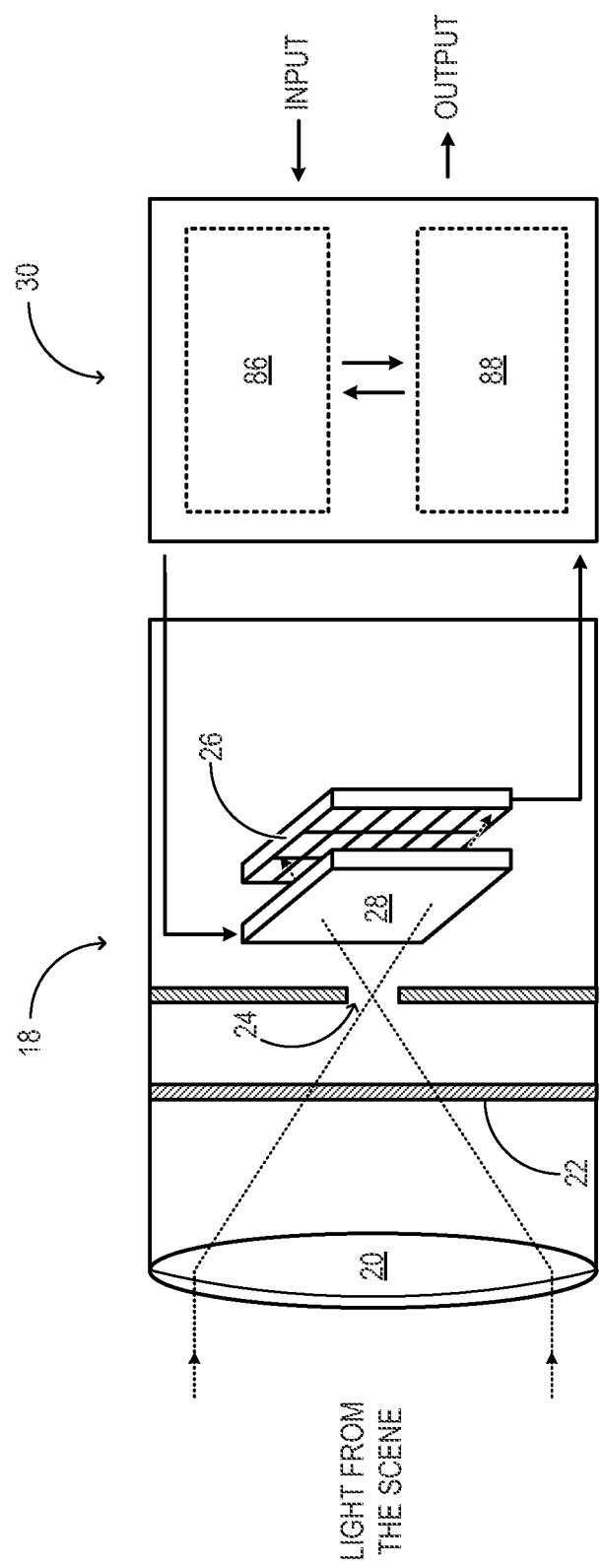
FIG. 2 schematically shows an example vision-system detector in accordance with an embodiment of this disclosure.

First detector 18 is configured inter alia to acquire a plane image of the scene that includes subject 10. FIG. 2 shows an embodiment of the first detector in schematic detail. The first detector includes lens 20, which focuses light from the scene through filter 22 and aperture 24, and onto detector array 26. The filter may be any suitable optical filter configured to limit the range of wavelengths and/or polarization states of the imaged light. It may comprise an interference filter, a color filter, and/or a polarizing filter. In this manner, the filter may reduce the degree to which ambient light interferes with vision system 12.

Detector array 26 may comprise any suitable ensemble of photosensitive elements—photodiode or charge-coupled device (CCD) elements, for example. The detector array is coupled to electronic shutter 28, which opens and closes at the command of controller 30. Accordingly, the image formed by the first detector may comprise a rectangular array of pixels. Controller 30 may be any suitable electronic control system of first detector 18 and/or vision system 12. When the electronic shutter is open, photon flux received in one or more of the photosensitive elements may be integrated as electric charge; when the electronic shutter is closed, the integration of the photon flux may be suspended. Accordingly, the electronic shutter may be commanded to open for a suitable period of time and close thereafter to accumulate a plane image of the scene or subject, or a portion thereof.

In some embodiments, controller 30 may be configured to synchronize the opening and closure of electronic shutter 28 to the pulse train from illumination source 16. In this way, it can be ensured that a suitable amount of reflected light from the illumination source reaches first detector 18 while electronic shutter 28 is open. Synchronization of the electronic shutter to the illumination source may enable other functionality as well, as described hereinafter.

Continuing in FIG. 2, controller 30 is configured to receive and process image data from detector array 26. The controller may receive other forms of input as well, and may be further configured to enact any computation, processing, or control function of vision system 12 or of the device in which the vision system is installed.

Figure 3:
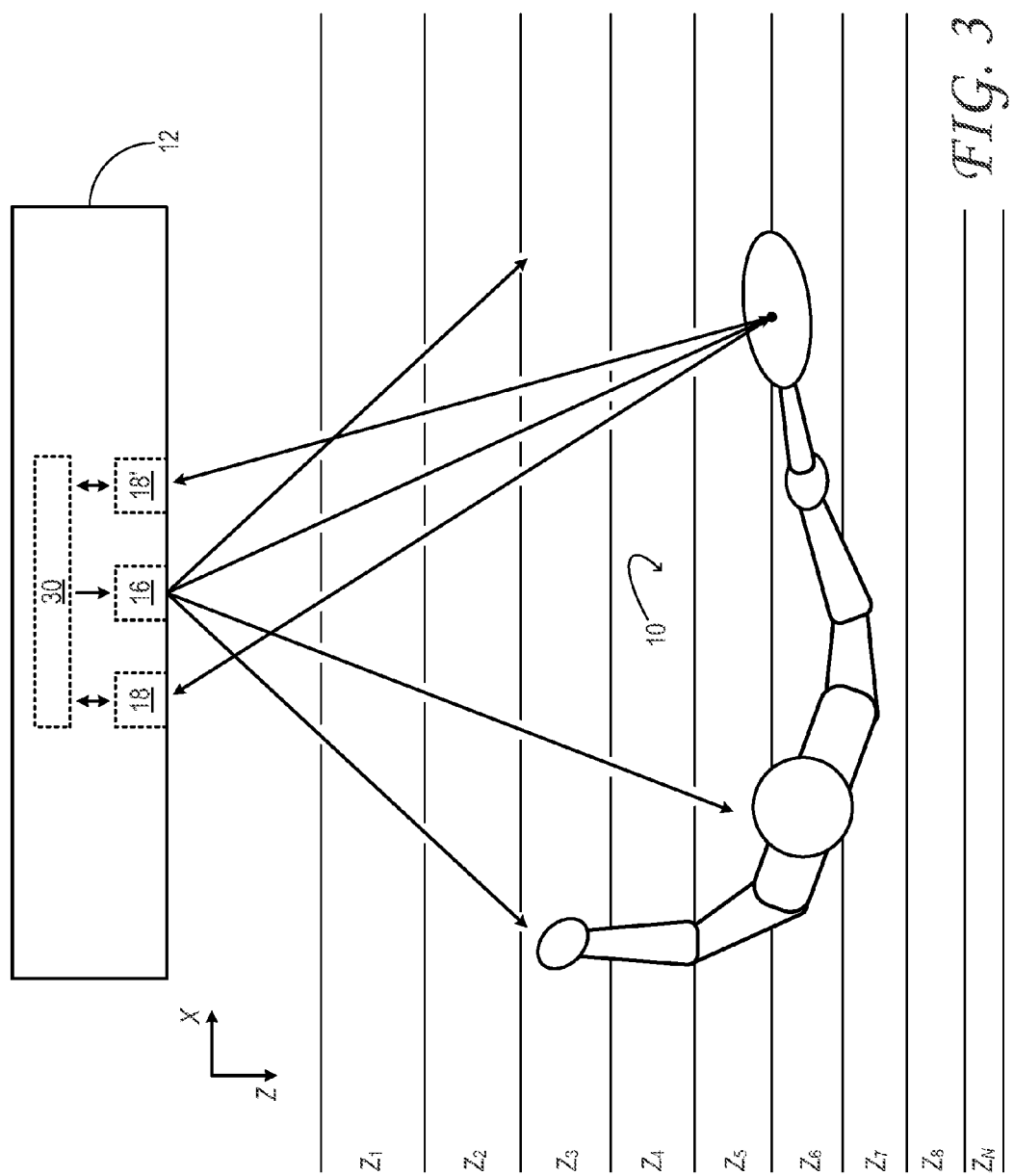
FIG. 3 schematically shows an example vision system and a subject in accordance with an embodiment of this disclosure.
Figure 4:
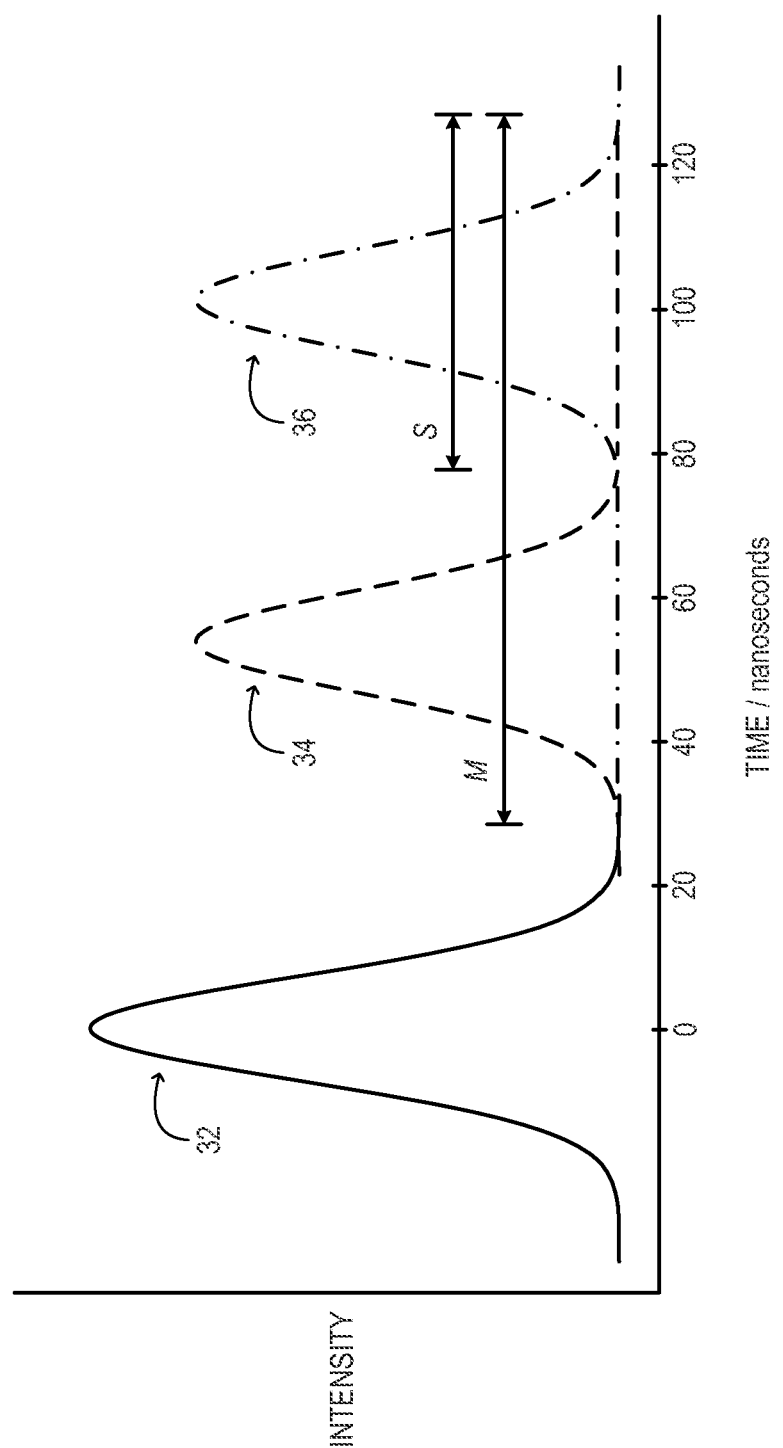
FIG. 4 illustrates an example temporal relationship between light pulses emitted and detected by a vision system in accordance with an embodiment of this disclosure.

Depth mapping with vision system 12 will now be described with reference to FIGS. 3 and 4. FIG. 3 shows aspects of subject 10 and vision system 12 from above, while FIG. 4 illustrates a temporal relationship between light pulses emitted and detected by the vision system.

As shown in FIG. 3, some loci of subject 10 may be positioned relatively close to vision system 12, at a small value of depth coordinate Z. Other loci may be positioned relatively far from the vision system, at a large value of the depth coordinate. Solid line 32 in FIG. 4 shows an example profile of a light pulse emitted from illumination source 16. In some embodiments, the full-width at half-maximum (FWHM) of the emitted pulse may be fifteen to twenty nanoseconds (ns). The pulse from the illumination source illuminates substantially all loci of the subject, both near and far, then reflects back to detector 18. However, light reflected from a relatively close, shallow locus will be received and detected more promptly than light reflected from a farther, deeper locus. Accordingly, dashed line 34 in FIG. 4 shows an example response from first detector 18 on receiving light reflected from a shallow locus, two meters from the vision system. Dot-dashed line 36 in FIG. 4 shows an analogous response from the first detector on receiving light reflected from a deeper locus, four meters from the vision system. In general, the period of time between the illumination pulse and the detector pulse is proportional to the round-trip distance from the illumination source to the locus that reflects the light, and back to the detector. Therefore, by timing the arrival of the detector pulse corresponding to a given locus, the distance out to that locus may be computed. This summarizes the so-called time-of-flight (TOF) approach to depth mapping.

A convenient, indirect way to time the arrival of reflected light at a detector is to open an electronic shutter of the detector during a finite interval defined relative to the illumination pulse, and to integrate the flux of light received at the detector during that interval. To illustrate this approach, two intervals are marked in FIG. 4—a first interval S and an overlapping, second interval M of longer duration. The shutter may be open during the interval marked S. In this case, the integrated response of the detector will increase with increasing depth of the reflecting locus in the two-to-four meter depth range, and will reach a maximum when the depth is four meters.

This simple approach may be refined to compensate for differences in reflectivity among the various loci of the subject. In particular, the detector may be held open during a second, longer interval, such as the interval marked M in FIG. 4. The ratio of the integrated detector response during the interval S to the integrated response during the interval M may be computed and used as an indication of depth.

The ratiometric TOF approach outlined above admits of numerous variants, as the reader will appreciate. For example, two adjacent, non-overlapping intervals may be used instead of the overlapping intervals noted above. In general, normalizing a gated detector response via multiple discrete measurements corrects for inhomogeneous or anisotropic reflectivity of the subject. A plurality of measurements can be made sequentially, using a single detector, or concurrently, using multiple detectors. With multiple detectors, the plurality of measurements may be extracted from multiple (e.g., first and second) images of the same scene, formed from light of the same illumination pulse. Accordingly, FIG. 3 shows second detector 18' coupled at the front face of vision system 12. The second detector, and the images formed therein, may be substantially the same as the first. As shown in the drawing, however, first detector 18 and second detector 18' are oriented along different (i.e., non-collinear) optical axes due to their separation. In some embodiments, the first and second detectors may be separated by two to twenty centimeters, although virtually any spacing is within the scope of this disclosure.

Both sequential and concurrent detection approaches pose disadvantages that may limit depth resolution. A disadvantage of sequential measurements is that the subject may move or transform non-negligibly between successive measurements; a disadvantage of multiple detectors is loss of depth resolution due to parallax error. Parallax error may result when multiple detectors oriented along different optical axes are used to image the same scene or subject.

One way to avoid parallax error is to couple first and second detectors with suitable beam-splitting optics so that they share a common optical axis. This approach, however, presents additional disadvantages. First, the beam splitting optics may be expensive and require careful alignment, thereby increasing the production cost of the vision system. Second, any beam-splitting approach will make inefficient use of the available illumination flux and aperture area, for it distributes the same reflection among different detectors instead of allowing each detector to receive a full reflection.

To address these issues while providing still other advantages, this disclosure describes various depth-mapping methods. These methods are enabled by and described with continued reference to the above configurations. It will be understood, however, that the methods here described, and others fully within the scope of this disclosure, may be enabled by other configurations as well. The methods may be executed any time vision system 12 is operating, and may be executed repeatedly. Naturally, each execution of a method may change the entry conditions for a subsequent execution and thereby invoke complex decision-making logic. Such logic is fully contemplated in this disclosure.

Some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 5:
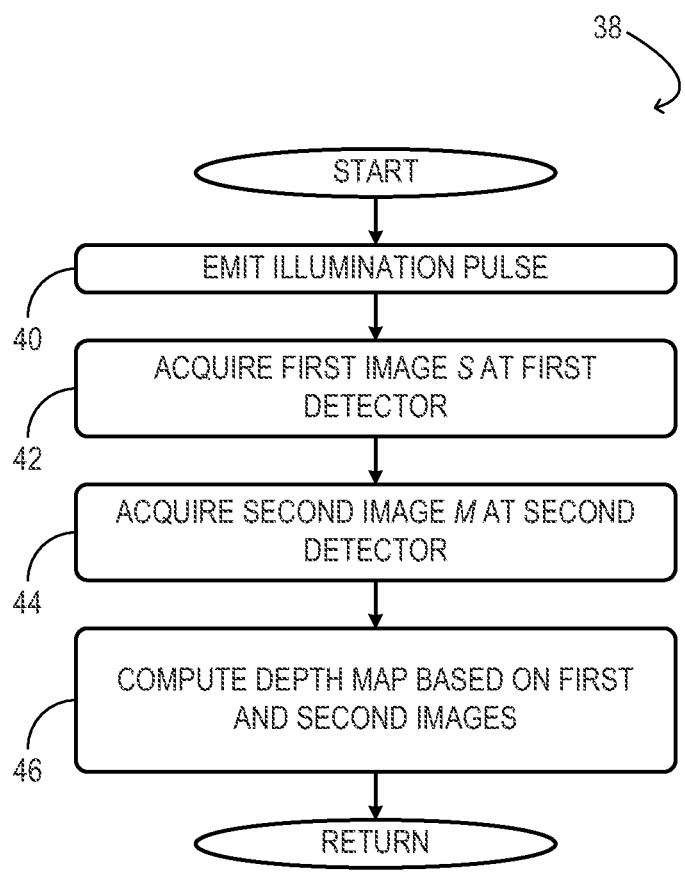
FIG. 5 illustrates an example depth-mapping method in accordance with an embodiment of this disclosure.

The approaches described herein may be used to map scenes of a wide range of depths, and are not limited to the specific examples provided herein. They may be used, for example, in the one-to-ten meter depth range—viz., where a shallowest locus of the scene is more than one meter from the first detector, and a deepest locus of the scene is less than ten meters from the first detector. FIG. 5 illustrates an example depth-mapping method 38. The method begins by exposing first and second detectors oriented along different optical axes to light dispersed from a scene.

At 40, therefore, an illumination source (e.g., illumination source 16) emits an illumination pulse directed to a scene. The illumination pulse may be a narrow (e.g., fifteen to twenty nanoseconds) pulse from a laser or LED array, as described above. At 42 a first image S is acquired at the first detector. At 44 a second image M is acquired at the second detector. In some embodiments, steps 42 and 44 may be enacted concurrently; in another embodiment, they may be enacted sequentially—e.g., using two closely spaced, consecutive pulses of the illumination source. For efficient use of the available illumination power and aperture size, the first and second detectors may each comprise a complete detector array (e.g., detector array 26 as described above). In other embodiments, however, the first and second detectors may detect light in respective first and second regions of the same detector array. This may correspond, for example, to a case where the detector array is operated in a mode where the first and second regions sight roughly the same part of the scene. In one particular embodiment, the detector may be operated in an interlaced mode, where half of the lines detect S, and the other half detects M. At 46 a depth map is computed based on the first and second images, as further described below. From 46, method 38 returns.

Figure 6:
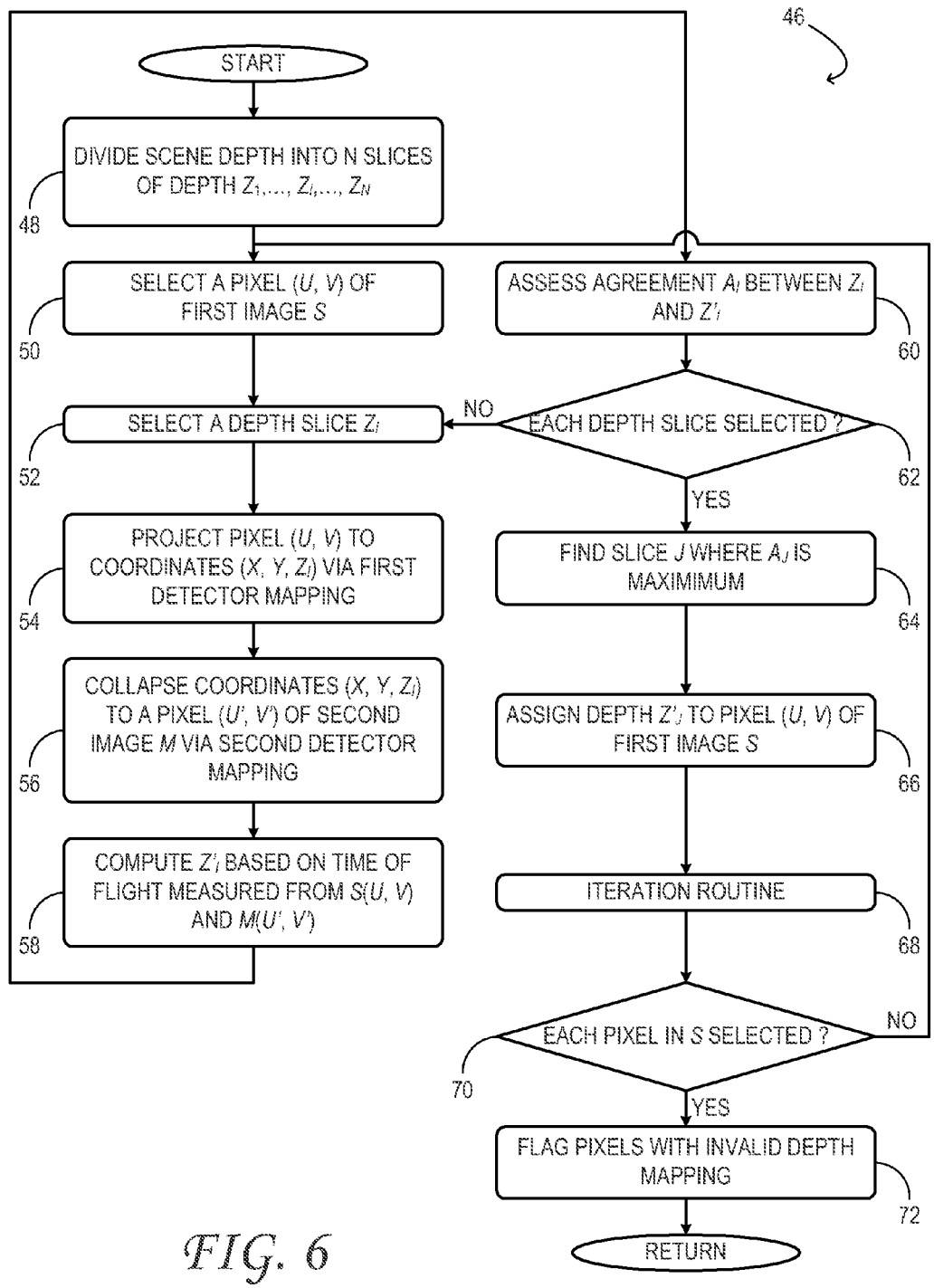
FIG. 6 illustrates an example method for computing a depth map based on first image S and second image M, in accordance with an embodiment of this disclosure.

FIG. 6 illustrates an example method 46 for computing a depth map based on first image S and second image M. At 48 the scene to be mapped is divided into N slices of depth $Z_1, \ldots, Z_I, \ldots, Z_N$, as shown in FIG. 3. In FIG. 6, the scene is divided in mutually parallel slices normal to the optical axes of first detector 18 and second detector 18'. In other embodiments, the scene may be divided differently—in radial shells equidistant from either detector or any other point on the vision system, for example. The scene may be divided into any number of intervals of any suitable size, including equal size. In some embodiments, however, the scene may be divided into intervals sized equally in reciprocal space—viz., $$Z_I = \frac{1}{\frac{1}{Z_N} + \left(\frac{I-1}{N-1}\right)\left(\frac{1}{Z_1} - \frac{1}{Z_N}\right)}.$$

Figure 7:
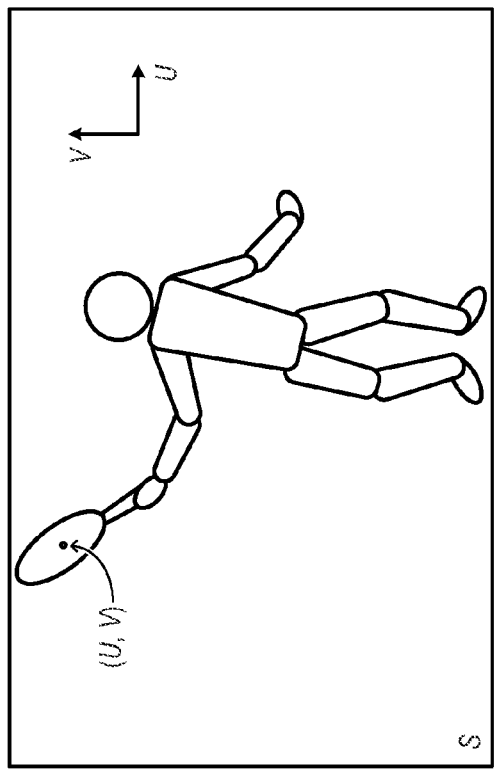
FIG. 7 illustrates example first and second images in accordance with an embodiment of this disclosure.
Figure 7:
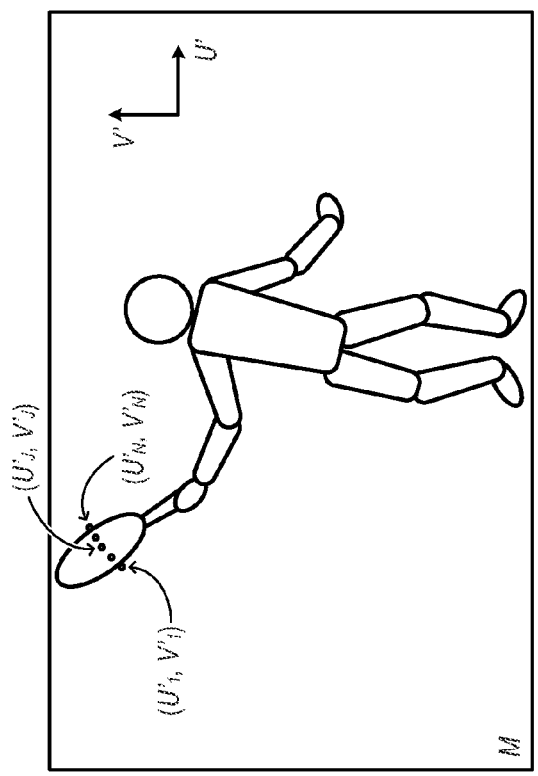

Returning now to FIG. 6, at 50 a pixel (U, V) of first image S is selected. Each pixel of the first image may be selected consecutively, by looping through the pixels of the first image. At 52 a depth slice $Z_I$ is selected. Each of the N depth slices may be selected consecutively, by looping through the series of depth slices defined above. At 54 pixel (U, V) of the first image is projected to coordinates (X, Y, $Z_I$) via a geometric mapping function of the first detector. At 56 coordinates (X, Y, $Z_I$) are collapsed to a pixel (U', V') of second image M via a geometric mapping function of the second detector, as illustrated in FIG. 7. With reference to the known distance between the first and second detectors, the geometric mapping functions may apply trigonometric relationships to project 2D coordinates from the first image to 3D coordinates and to collapse the 3D coordinates down to 2D coordinates of the second image. In this manner a series of candidate pixels of the second image are enumerated.

Returning again to FIG. 6, at 58 a depth measurement $Z'_I$ is computed via a time-of-flight computation based on pixel $(U'_I, V'_I)$ of second image M and pixel (U, V) of first image S—viz., $$Z_I' = f_{TOF}[S(U,V), M(U_I', V_I')],$$

where S(U, V) and $M(U'_I, V'_I)$ represent the integrated intensities of the selected pixels of the first and second images, respectively, and $f_{TOF}$ is a suitable TOF function. In this and other embodiments, the computed $Z'_I$ increases with an increasing first amount of light received by the first detector during a first period S, and decreases with an increasing second amount of light received by the second detector during a second period M. Here, the first amount of light is a brightness integrated at a first pixel of the first image, and the second amount of light is a brightness integrated at a second pixel of the second image.

In one example, $f_{TOF}$ may be linear in the ratio of the integrated intensities—i.e., $$Z_I' = Z_1 + (Z_N - Z_1)\frac{S(U, V)}{M(U_I', V_I')}.$$

Thus, the depth output may vary substantially linearly with a ratio of the first amount of light to the second amount of light.

At 60 the level of agreement $A_I$ between $Z_I$ and $Z'_I$ is assessed. The level of agreement may be quantified in any suitable manner. In one example, $$A_I = -|Z_I - Z_I'|.$$

In other examples, the level of agreement may be assessed differently. For example, the level of agreement may be assessed by measuring the distance between the pixel positions corresponding to the same locus in the two different detectors. Once the TOF depth is evaluated for a given slice based on first-detector mapping, one may collapse the projected locus down to a pixel position of the second detector. Here, $A_I$ may decrease with increasing distance between (U, V) and (U', V').

At 62 it is determined whether each depth slice has been selected. If each depth slice has not been selected, then the method returns to 52, where the next depth slice is selected. Otherwise, the method advances to 64. At 64 a depth slice J is found for which the computed agreement $A_J$ is greatest. At 66 a depth value of $Z'_J$ is assigned to pixel (U, V) of first image S. In some embodiments, this depth value may be assigned instead to pixel (U', V') of second image M. In yet another embodiment, this same depth value may be assigned to the indicated pixels of both images. Thus, from the enumerated series of candidate pixels of the second image, one pixel is selected such that the computed TOF depth value indicates a depth of a locus most closely mappable to the first and second pixels.

In the illustrated embodiment, an iteration routine is invoked at 68 to improve the accuracy of the depth mapping. An example iteration routine is described below in the context of FIG. 8. In other embodiments, the iteration routine may be omitted.

Continuing in FIG. 6, at 70 it is determined whether each pixel in first image S has been selected. If each pixel of the first image has not been selected, then the method returns to 50. Otherwise, the method advances to 72. At 72 pixels with invalid depth mapping are flagged. In general, a depth output may be flagged as invalid when the locus most closely mappable to the first and second pixels is outside of a predefined range. In some embodiments, the depth mapping of a pixel may be flagged as invalid if the maximum agreement $A_J$ computed at 64 is below a threshold value. In another embodiment, the depth mapping of a pixel may be flagged as invalid if an iteration routine (vide infra) fails to converge after a maximum number of iterations is reached. In still other embodiments, depth mapping invalidity may be assessed globally, by comparing computed depths from adjacent or nearby pixels in the first or second images. In particular, when the depth changes abruptly or discontinuously at a pixel, the depth of that pixel may be flagged as invalid. Thus, the predefined range of valid depth may be defined based in part on an indicated depth of a neighboring locus of the scene. From 72, the method returns.

Figure 8:
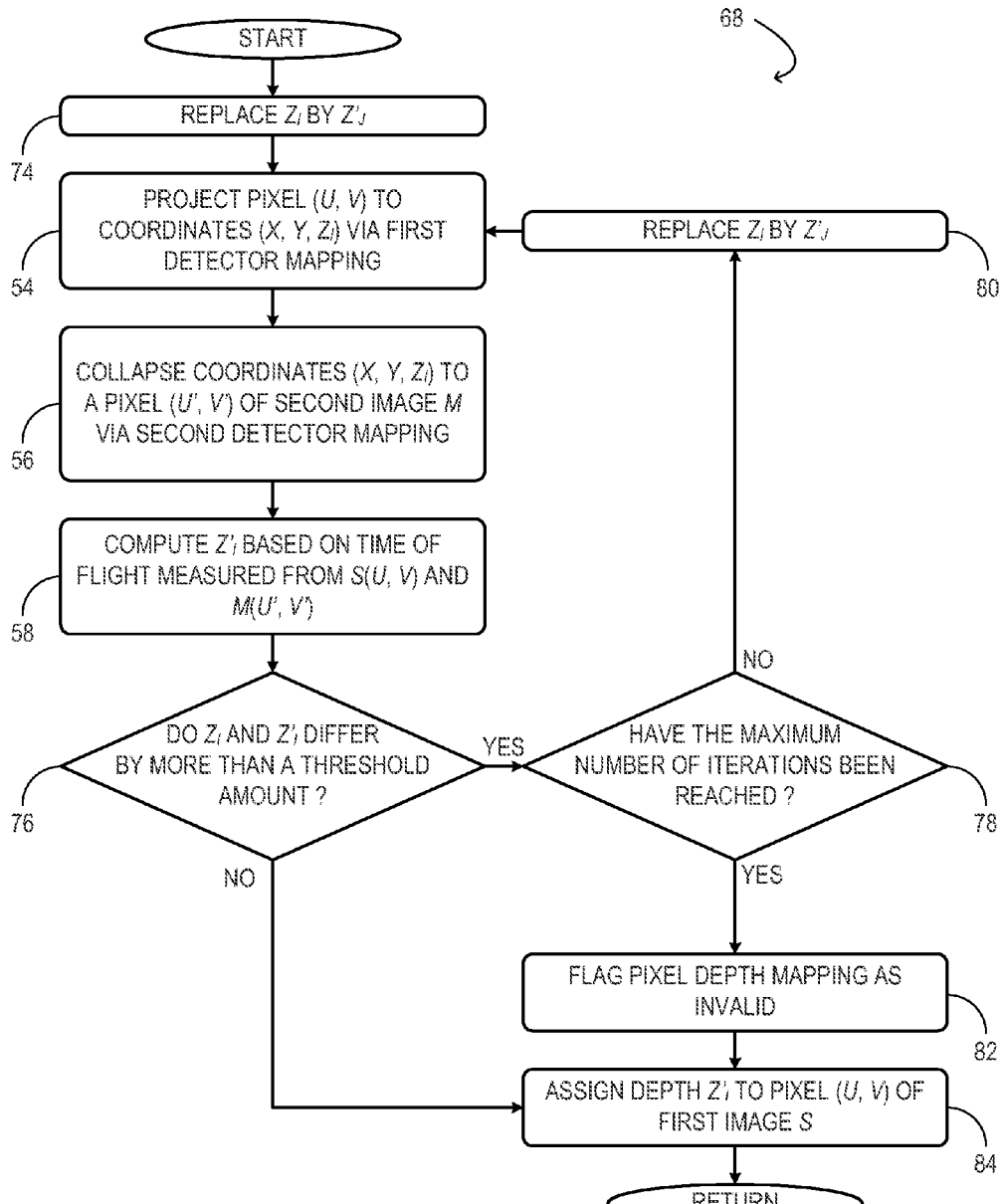
FIG. 8 illustrates an example method for enacting an iteration routine to improve depth-mapping accuracy, in accordance with an embodiment of this disclosure.

FIG. 8 illustrates an example method 68 for enacting an iteration routine to improve the accuracy of the depth mapping procedure described above. At 74, $Z_I$ is replaced by $Z'_I$. At 54 pixel (U, V) of first image S is projected to coordinates (X, Y, $Z_I$) via a geometric mapping function of the first detector. At 56 coordinates (X, Y, $Z_I$) are collapsed to a pixel (U', V') of second image M via a geometric mapping function of the second detector. At 58 a depth measurement $Z'_I$ is computed via a time-of-flight computation based on pixel ($U'_I$, $V'_I$) of second image M and pixel (U, V) of first image S. In this manner, a running depth value may be recomputed, using, as the second amount of light, a brightness integrated at the refined second pixel of the second image. At 76 it is determined whether $Z_I$ and $Z'_I$ differ by more than a threshold amount. If so, then method 68 advances to 78, where it is determined whether the maximum number of iterations have been reached. If the maximum number of iterations have not been reached, then the method advances to 80, where $Z_I$ is replaced by $Z'_I$, and execution continues at 54. Thus, the actions of projecting, collapsing, and recomputing may be repeated for a finite number of iterations, or until the output has converged.

However, if the maximum number of iterations have been reached at 78, then the method advances to 82, where the computed depth mapping for pixel (U, V) of the first image is flagged as invalid. Thus, the depth output may be invalidated if the output does not converge in the finite number of iterations. From this point, or from 76 if it was determined that $Z_I$ and $Z'_I$ do not differ by more than the threshold amount, method 68 advances to 84. At 84, a depth value of $Z'_I$ is assigned to pixel (U, V) of first image 5, analogous to the assignment made at 66 of method 46. From 84, method 68 returns.

Although the foregoing methods are illustrated without reference to explicit alignment of the first and second images, such alignment may be enacted in various ways. For example, mapping a representative set of loci distributed over the scene would supply data that could be used to construct an appropriate function for mapping the pixels of the second image onto the first, or vice versa.

As noted above, the methods and functions described herein may be enacted via controller 30, shown schematically in FIG. 2. The illustrated controller includes logic subsystem 86 operatively coupled to memory subsystem 88. Memory subsystem 88 may hold instructions that cause logic subsystem 86 to enact the various methods. To this end, the logic subsystem may include one or more physical devices configured to execute instructions. For example, the logic subsystem may be configured to execute instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors configured to execute software instructions. Additionally or alternatively, the logic subsystem may include one or more hardware or firmware logic machines configured to execute hardware or firmware instructions. The logic subsystem may optionally include components distributed among two or more devices, which may be remotely located in some embodiments.

Memory subsystem 88 may include one or more physical, non-transitory, devices configured to hold data and/or instructions executable by logic subsystem 86 to implement the methods and functions described herein. When such methods and functions are implemented, the state of the memory subsystem may be transformed (e.g., to hold different data). The memory subsystem may include removable media and/or built-in devices. The memory subsystem may include optical memory devices, semiconductor memory devices, and/or magnetic memory devices, among others. The memory subsystem may include devices with one or more of the following characteristics: volatile, nonvolatile, dynamic, static, read/write, read-only, random access, sequential access, location addressable, file addressable, and content addressable. In one embodiment, the logic subsystem and the memory subsystem may be integrated into one or more common devices, such as an application-specific integrated circuit (ASIC) or so-called system-on-a-chip. In another embodiment, the memory subsystem may include computer-system readable removable media, which may be used to store and/or transfer data and/or instructions executable to implement the herein-described methods and processes. Examples of such removable media include CD's, DVD's, HD-DVD's, Blu-Ray Discs, EEPROMs, and/or floppy disks, among others.

In contrast, in some embodiments aspects of the instructions described herein may be propagated in a transitory fashion by a pure signal—e.g., an electromagnetic signal, an optical signal, etc.—that is not held by a physical device for at least a finite duration. Furthermore, data and/or other forms of information pertaining to the present disclosure may be propagated by a pure signal.

The terms 'module' and 'engine' may be used to describe an aspect of controller 30 that is implemented to perform one or more particular functions. In some cases, such a module or engine may be instantiated via logic subsystem 86 executing instructions held by memory subsystem 88. It will be understood that different modules and/or engines may be instantiated from the same application, code block, object, routine, and/or function. Likewise, the same module and/or engine may be instantiated by different applications, code blocks, objects, routines, and/or functions in some cases.

FIG. 2 also shows controller 30 operatively coupled to the components of a user interface, which includes various input devices and output devices, such as display 14. Display 14 may provide a visual representation of data held by memory subsystem 88. As the herein-described methods and processes change the data held by the memory subsystem, and thus transform the state of the memory subsystem, the state of the display may likewise be transformed to visually represent changes in the underlying data. The display may include one or more display devices utilizing virtually any type of technology. Such display devices may be combined with logic subsystem 86 and/or memory subsystem 88 in a shared enclosure, or such display devices may be peripheral display devices.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A depth-mapping method comprising:
  directing modulated infrared or near-infrared illumination onto a scene;
  exposing first and second detectors oriented along different optical axes to light dispersed from the scene;
  for each of a series of candidate depths into the scene, mapping a pixel of the first detector to 3D coordinates having the candidate depth, reverse mapping the 3D coordinates to a candidate pixel of the second detector, and computing a depth based on an integrated response from the pixel of the first detector versus the candidate pixel of the second detector, the computed depth increasing with an increasing amount of light received at the pixel of the first detector during a first period and decreasing with an increasing amount of light received at the candidate pixel of the second detector during a second period;
  for each of the series of candidate depths, assessing agreement between the candidate depth and the corresponding computed depth; and
  furnishing an output associated with the pixel of the first detector, the output based on the computed depth of closest agreement to the corresponding candidate depth.

2. The method of claim 1, wherein the scene includes a plurality of loci, and wherein the output is one of a plurality of outputs corresponding to the plurality of loci, each output indicating a depth of its corresponding locus.

3. The method of claim 1, wherein the first detector forms a first image of the scene and the second detector forms a second image of the scene, wherein the first and second images each comprise a rectangular array of pixels, and wherein the first and second periods overlap and differ in duration.

4. The method of claim 1 further comprising:
  mapping the pixel of the first detector to 3D coordinates having the computed depth of closest agreement to the corresponding candidate depth;
  reverse mapping the 3D coordinates to a refined second pixel of the second detector;
  computing a refined depth based on an integrated response from the pixel of the first detector versus the refined second pixel of the second detector; and
  furnishing a recomputed output associated with the pixel of the first detector, the recomputed output based on the refined depth.

5. The method of claim 4 further comprising repeating said mapping, reverse mapping, and computing for a finite number of iterations, or until the recomputed output has converged.

6. The method of claim 5 further comprising invalidating the recomputed output if the recomputed output does not converge in the finite number of iterations.

7. The method of claim 1, wherein the output varies substantially linearly with a ratio of the first amount of light to the second amount of light.

8. The method of claim 1 further comprising directing pulsed illumination onto the scene.

9. The method of claim 1 further comprising invalidating the output when the computed depth of closest agreement to the corresponding candidate depth is outside of a predefined range.

10. The method of claim 9, wherein the predefined range is defined based on a depth of a neighboring locus of the scene.

11. The method of claim 3 further comprising aligning the second image to the first image.

12. The method of claim 2, wherein a shallowest locus of the scene is more than one meter from the first detector, and a deepest locus of the scene is less than ten meters from the first detector.

13. A vision system comprising:
  a modulated illumination source configured to illuminate a scene using modulated infrared or near-infrared illumination;
  first and second detectors oriented along different optical axes and arranged to detect light dispersed from the scene, such light including the modulated infrared or near-infrared illumination reflected back from the scene, with wavelength-responsiveness of the first and second detectors limited substantially to the modulated infrared or near-infrared illumination;
  a controller operatively coupled to the first and second detectors and to a source, and configured to:
    for each of a series of candidate depths into the scene, map a pixel of the first detector to 3D coordinates having the candidate depth, reverse map the 3D coordinates to a candidate pixel of the second detector, and compute a depth based on an integrated response from the pixel of the first detector versus the candidate pixel of the second detector, the computed depth increasing with an increasing amount of light received at the pixel of the first detector during a first period and decreasing with an increasing amount of light received at the candidate pixel of the second detector during a second period;
    for each of the series of candidate depths, assess agreement between the candidate depth and the corresponding computed depth; and
    furnish an output associated with the pixel of the first detector, the output based on the computed depth of closest agreement to the corresponding candidate depth.

14. The system of claim 13, wherein the source is pulse-modulated with a pulse-width of fifteen to twenty nanoseconds.

15. The system of claim 13, wherein the source comprises one or more of an infrared or near-infrared light-emitting diode and a laser.

16. The system of claim 13, wherein the first and second detectors are adjacent or separated by two to twenty centimeters.

17. A depth-mapping method comprising:
  directing pulsed infrared or near-infrared illumination to a scene, the scene including a plurality of loci;
  exposing first and second detectors oriented along different optical axes to light dispersed from the scene, such light including the pulsed infrared or near-infrared illumination reflected back from the scene, with wavelength-responsiveness of the first and second detectors limited substantially to the modulated infrared or near-infrared illumination;

forming a first image of the scene at a first detector and a second image of the scene at a second detector, the first and second images each comprising a rectangular array of pixels;

for each of a series of candidate depths into the scene, mapping a pixel of the first detector to 3D coordinates having the candidate depth, reverse mapping the 3D coordinates to a candidate pixel of the second detector, and computing a depth based on an integrated response from the pixel of the first detector versus the candidate pixel of the second detector, the computed depth increasing with an increasing amount of light received at the pixel of the first detector during a first period and decreasing with an increasing amount of light received at the candidate pixel of the second detector during a second period;

for each of the series of candidate depths, assessing agreement between the candidate depth and a corresponding computed depth; and furnishing an output associated with the pixel of the first detector, the output based on the computed depth of closest agreement to the corresponding candidate depth.

18. The method of claim 17, wherein the first and second images are formed at least partly from light of the same illumination pulse.

19. The method of claim 1 wherein the light to which the first and second detectors are exposed includes the modulated infrared or near-infrared illumination reflected back from the scene, and wherein wavelength-responsiveness of the first and second detectors is limited substantially to the modulated infrared or near-infrared illumination.

20. The method of claim 1 wherein the candidate pixel of the first detector is mapped to the 3D coordinates using a geometric mapping function of the first detector, and wherein the 3D coordinates are reverse mapped to define a candidate pixel of the second detector using a geometric mapping function of the second detector.

* * * * *